(12) United States Patent
Watanabe (10) Patent No.: US 7,824,085 B2
(45) Date of Patent: Nov. 2, 2010

(54) VEHICULAR ILLUMINATION DEVICE (75) Inventor: Shinya Watanabe, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 189 days.

(21) Appl. No.: 12/000,272

(22) Filed: Dec. 11, 2007

(65) Prior Publication Data
US 2008/0144326 A1 Jun. 19, 2008

(30) Foreign Application Priority Data
Dec. 15, 2006 (JP) .............................. 2006-337997

(51) Int. Cl.
*B60Q 1/00* (2006.01)
(52) U.S. Cl. ...................... 362/466; 362/465
(58) Field of Classification Search ................. 362/465, 362/466
See application file for complete search history.

(56) References Cited

U.S. PATENT DOCUMENTS

| 6,049,171 | A * | 4/2000 | Stam et al. ..................... 315/82 |
| 6,709,135 | B2 * | 3/2004 | Couillaud et al. ........... 362/465 |
| 6,861,809 | B2 | 3/2005 | Stam |
| 2002/0001194 | A1 * | 1/2002 | Toda et al. ................... 362/465 |
| 2004/0246731 | A1 * | 12/2004 | Hayashi et al. ............. 362/466 |
| 2006/0291222 | A1 * | 12/2006 | Ando ........................ 362/466 |
| 2007/0025122 | A1 * | 2/2007 | Zub et al. ..................... 363/16 |

FOREIGN PATENT DOCUMENTS

| DE | 19902015 | 7/2000 |
| EP | 1 142 757 | 9/2004 |
| JP | 2003-159986 | 6/2003 |
| JP | 2003-267125 | 9/2003 |
| JP | 2004-359175 | 12/2004 |
| JP | 2006-021631 | 1/2006 |

OTHER PUBLICATIONS

German Office Action dated Sep. 8, 2009 for Application No. 10 2007 055 803.3-56.

* cited by examiner

*Primary Examiner*—Sandra L O'Shea
*Assistant Examiner*—Evan Dzierzynski
(74) *Attorney, Agent, or Firm*—Finnegan, Henderson, Farabow, Garrett & Dunner, LLP (57) ABSTRACT

A vehicular illumination device includes a light distribution control unit, a determination unit and a control unit. The light distribution control unit performs an alteration control of a vehicular illumination unit so as to alter a light distribution with respect to an illumination object detected by a detection unit. When the illumination object ceases to be detected, the determination unit determines whether or not there is a need to maintain the alteration control in a current state. When it is determined that there is a need to maintain the alteration control in the current state, the control unit controls the light distribution control unit so as to maintain the alteration control in the current state.

4 Claims, 6 Drawing Sheets

| HEADLAMP DIVIDED REGION No. | LED LIGHT SOURCE NO. |
|---|---|
| 1 | 1~8 |
| 2 | 9~12 |
| 3 | 13~15 |
| 4 | 16 |
| 5 | 17 |
| 6 | 18, 19 |
| 7 | 20~22 |
| 8 | 23~27 |

DIVIDED
REGION No.: 1    2    3    4   5   6   7    8

DIVIDED
REGION No.: 1    2    3    4   5   6   7    8

DIVIDED
REGION No.: 1    2    3    4   5   6   7    8

VEHICULAR ILLUMINATION DEVICE

CROSS-REFERENCE TO RELATED APPLICATION

This application claims priority under 35 USC 119 from Japanese Patent Application No. 2006-337997, the disclosure of which is incorporated by reference herein.

BACKGROUND

1. Technical Field

The present invention relates to a vehicular illumination device, and more particularly to a vehicular illumination device which controls a light distribution of a headlamp or the like.

2. Related Art

A technology described in, for example, Japanese Patent Application Laid-Open (JP-A) No. 2006-21631 has been proposed as a vehicular illumination device for controlling a light distribution of a headlamp or the like.

The technology described in JP-A No. 2006-21631 proposes the provision of: a plurality of light sources that illuminate respectively different regions and form a predetermined light distribution pattern, the whole of which includes a main light distribution region and a peripheral light distribution region; a camera that captures images forward of the vehicle; a hazard judgment section that, on the basis of images acquired by the camera, identifies hazardous objects that are pertinent to passage of the vehicle as hazards; and a light source control section that, if a hazard identified by the hazard judgment section is outside the main light distribution region, alters an orientation of a plurality of the light sources to illuminate the hazard. That is, the technology described in JP-A No. 2006-21631 proposes performing light distribution control such that an object around a subject vehicle is identified by imaging it with a camera and a light axis is oriented with respect to the identified object.

However, with the technology described in JP-A No. 2006-21631, when a non-subject or an opposing vehicle is identified and light distribution control is being performed, if the subject vehicle drives over a step in a road surface, then the subject vehicle is tilted on the way, and thus the opposing vehicle temporarily falls outside a detection range of the camera so that the light distribution control is ended. Then, after driving over the step, the subject vehicle returns to its initial attitude, and the illumination object re-enters the detection range of the camera, whereupon light distribution control starts again. Thus, in conditions in which there are many steps in a road surface, light distribution control will be started and ended repeatedly. Accordingly, there is room for improvement of the light distribution control.

SUMMARY

The present invention has been made in consideration of the circumstances described above, and an object of the present invention is to suppress chattering of light distribution control and prevent a load increase of light distribution control.

A first aspect of the present invention provides a vehicular illumination device including: a vehicular illumination unit whose light distribution is alterable; a detection unit that detects an illumination object; a light distribution control unit that performs alteration control of the vehicular illumination unit so as to alter a light distribution with respect to the illumination object detected by the detection unit; a judgment unit that, when the illumination object detected by the detection unit ceases to be detected, judges whether or not there is a need to maintain the alteration control by the light distribution control unit in a current state; and a control unit that, when it is judged by the judgment unit that there is a need to maintain the alteration control in the current state, controls the light distribution control unit so as to maintain the alteration control by the light distribution control unit in the current state.

According to the first aspect of the present invention, the vehicular illumination unit is capable of altering the light distribution. The vehicular illumination unit may use, for example, headlamps of a vehicle. Furthermore, the vehicular illumination unit may use, for example: a structure that can control lighting of respective light sources of an array light source, in which light sources such as LED light sources or the like which may be controlled to be independently turned on and off are plurally arrayed, to alter a light distribution thereof; a structure that can use a spatial light modulator such as a DMD (digital micromirror device), a liquid crystal device or the like to alter a light distribution of light from a light source; a structure that can use shutters or the like to alter a light distribution of light from a light source; or the like.

An illumination object is detected by the detection unit. A camera or the like, for example, may be used as the detection unit. Illumination objects such as other vehicles, pedestrians and so forth can be detected by the camera or the like. Further, when a non-subject vehicle is being detected, it is possible to simply detect the non-subject vehicle by detecting light-emitting points of the non-subject vehicle.

The light distribution control unit performs alteration control of the vehicular illumination unit so as to alter a light distribution with respect to an illumination object detected by the detection unit. For example, the light distribution control unit may perform alteration control of the vehicular illumination unit such that light illuminated from the vehicular illumination unit to a region corresponding to the illumination object detected by the detection unit is non-illuminated or reduced, or may be such that a light axis is shifted toward a direction of the illumination object.

When the illumination object that was detected by the detection unit ceases to be detected, the judgment unit judges whether or not it is necessary to maintain the light distribution alteration control of the vehicular illumination unit by the light distribution control unit in a current state. If the judgment unit determines that it is necessary to maintain the light distribution alteration control in the current state, the control unit controls the light distribution control unit such that the light distribution alteration control by the light distribution control unit is maintained in the current state. That is, it is judged by the judgment unit whether or not it is to maintain light distribution alteration control of the vehicular illumination unit in the current state, and light distribution control is implemented. As a result, chattering of control due to the light distribution control being carried out can be prevented. Thus, since control chattering can be prevented, a load increase in the light distribution control can be suppressed.

For example, the judgment unit may judge that there is a need to maintain the alteration control by the light distribution control unit in the current state when a vertical movement of the subject vehicle is detected by a vertical movement detection unit, which detects a vertical movement of the subject vehicle. Accordingly, when vertical movement of the vehicle which is equal to or greater than a predetermined value is caused due to the vehicle driving over a step in a road surface, because the current light distribution control state is maintained, chattering that would otherwise occur when driving over a road surface step can be prevented.

The vertical movement detection unit may use a vehicle height detection sensor that detects a vehicle height of the subject vehicle.

Further, the judgment unit may be configured so as to make a judgment such that there is a need to maintain the alteration control by the light distribution alteration unit in the current state when the vertical movement detection units detects that a vertical movement of the subject vehicle exceeds a predetermined range (for example, a predetermined range, a detection range of the detection unit or the like). With such a configuration, light distribution alteration control is performed within a range in which the detection unit can perform detection so that the current light distribution is maintained only when the detection range is exceeded, whereby control chattering can be prevented while securing alteration control in a required range.

DETAILED DESCRIPTION

Figure 1:
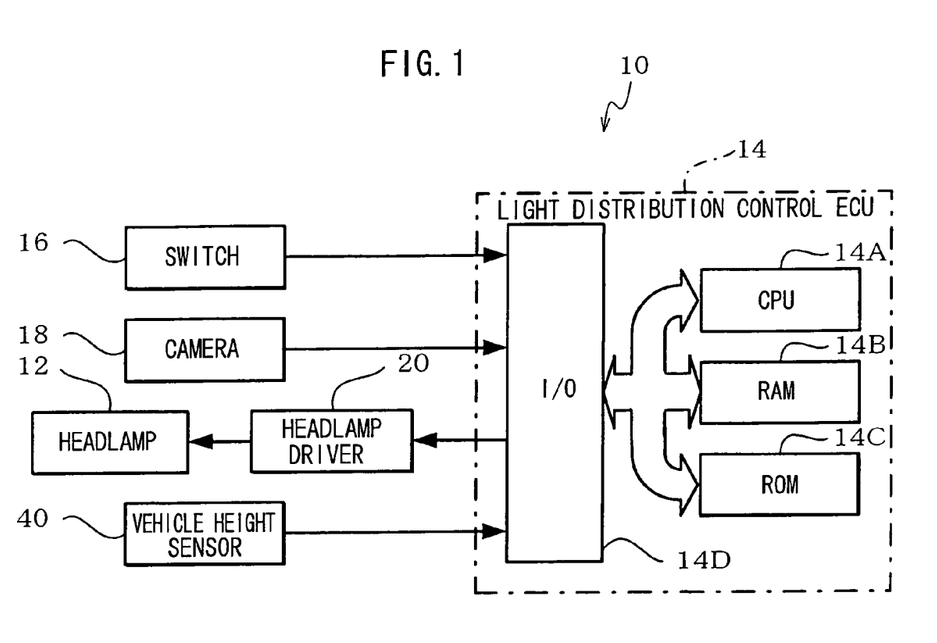
FIG. 1 is a block diagram showing structure of a vehicular illumination device relating to an embodiment of the present invention.

Herebelow, an example of an embodiment of the present invention will be described in detail with reference to the drawings. FIG. 1 is a block diagram showing a structure of a vehicular illumination device relating to an embodiment of the present invention.

In a vehicular illumination device 10 relating to the embodiment of the present invention, as shown in FIG. 1, a headlamp 12 provided at a vehicle is connected to a light distribution control ECU 14, and lighting and extinguishing of the headlamp 12 are controlled by the light distribution control ECU 14.

In the present embodiment, the light distribution control ECU 14 carries out light distribution control so as to extinguish, of light distribution regions of the headlamp 12, a region corresponding to a non-subject vehicle such as an opposing vehicle in front.

The light distribution control ECU 14 is structured by a microcomputer including a CPU 14A, a RAM 14B, a ROM 14C and an I/O 14D.

A table for implementing light distribution control of the headlamp 12, a program for executing a light distribution control routine, which will be described later, and the like are stored in the ROM 14C of the light distribution control ECU 14. The RAM 14B is used as a memory for implementing various calculations and the like, which are performed by the CPU 14A, and so forth.

A switch 16, a camera 18, a headlamp driver 20 and a vehicle height sensor 40 are connected to the I/O 14D. An actuation state of the switch 16, a result of image capture of forward of the vehicle by the camera 18, a detection result from the vehicle height sensor 40 and the like are inputted to the I/O 14D of the light distribution control ECU 14.

The switch 16 instructs the headlamp 12 turning on-and-off, low beam or high beam, and outputs instruction results to the light distribution control ECU 14. The camera 18 capture an image forward of the vehicle, and outputs a result of the image capture to the light distribution control ECU 14.

The light distribution control ECU 14 controls the headlamp driver 20 in accordance with the state of the switch 16, implements lighting of the headlamp 12, and controls a light distribution of the headlamp 12 such that light from the headlamp is irradiated onto a region corresponding to an opposing vehicle.

In the light distribution control of the headlamp 12 by the light distribution control ECU 14, an opposing vehicle is detected on the basis of a captured image from the camera 18, a region corresponding to the opposing vehicle layer is specified, and the light distribution of the headlamp 12 is controlled such that light from the headlamp 12 is not illuminated toward the region corresponding to the opposing vehicle. While in the present embodiment, the light distribution is controlled such that light from the headlamp is not illuminated toward a divided region in which the opposing vehicle is present, it is also possible that the light distribution may be performed for light reduction instead of no light illumination.

Figure 2:
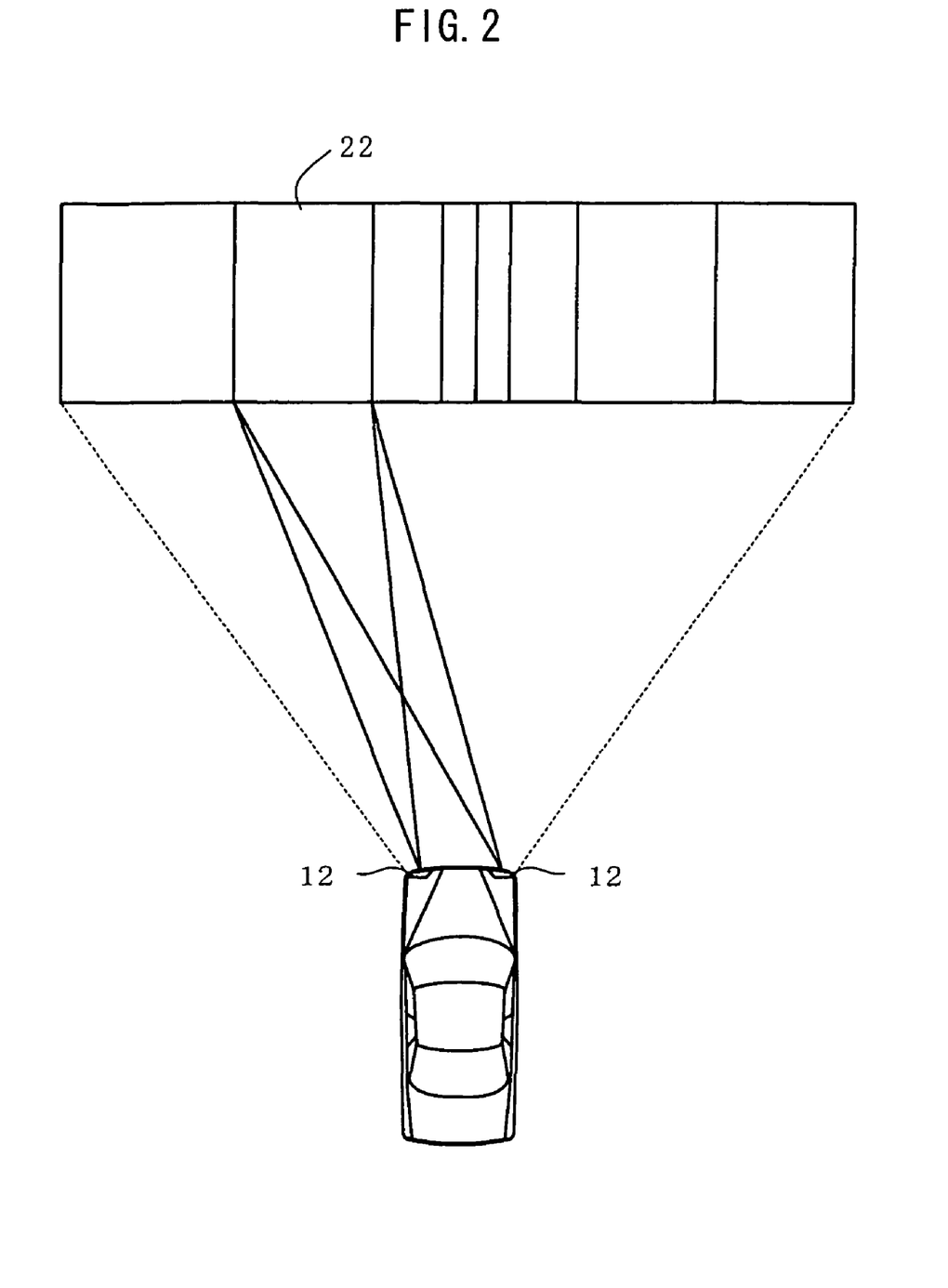
FIG. 2 is a diagram for describing divided regions of a light distribution range of headlamps of the vehicular illumination device relating to an embodiment of the present invention.

As for the headlamp 12, two headlamps are provided at a front end portion of the vehicle. As shown in FIG. 2, a light distribution region of the headlamps 12 is plurally divided in a vehicle width direction such that illumination or non-illumination with respect to respective divided regions 22 is enabled, and thus a light distribution with respect to the respective divided regions can be altered. In this manner, illumination or non-illumination of light toward the divided region is controlled by the light distribution control ECU 14.

Figure 3A:
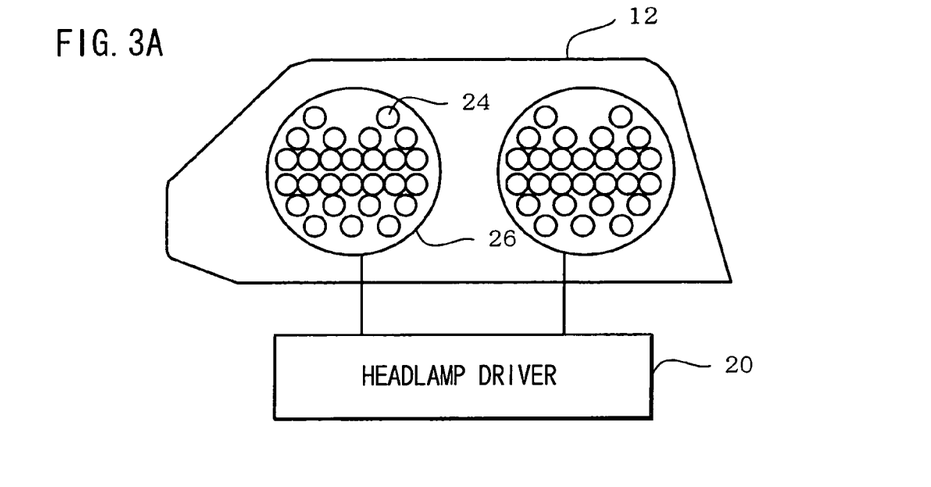
FIG. 3A is a diagram showing an example of a headlamp that can be used with the vehicular illumination device relating to an embodiment of the present invention.
Figure 3B:
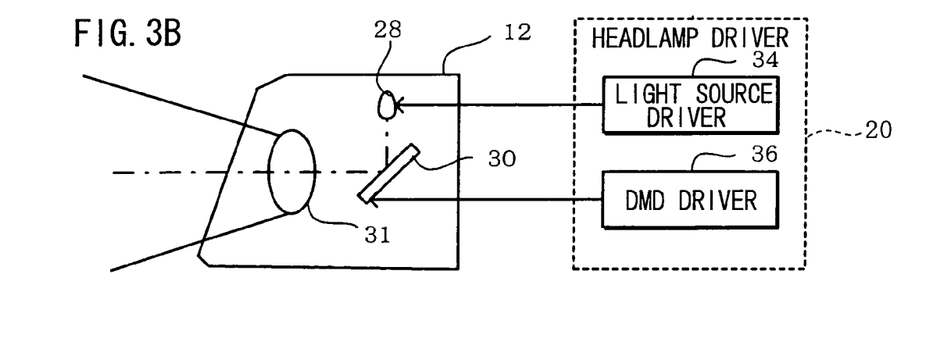
FIG. 3B and FIG. 3C are diagrams showing an example of a headlamp that can be used with the vehicular illumination device relating to an embodiment of the present invention.

FIG. 3A and FIG. 3B are diagrams showing examples of headlamps which are employable with the vehicular illumination device 10 relating to the embodiment of the present invention.

For example, as shown in FIG. 3A, the headlamp 12 may use a structure in which plural LED light sources 24 are provided and the headlamp driver 20 is capable of implementing illumination or non-illumination of light toward each divided region 22 shown in FIG. 2 by controlling to turn on and off the plural LED light sources 24. In the example shown in FIG. 3A, the headlamp includes two LED lamps 26 equipped with the plural LED light sources 24. For example, one of the LED lamps 26 may be used for low-beam lighting while the other LED lamp 26 may be used for high-beam lighting.

Figure 3C:
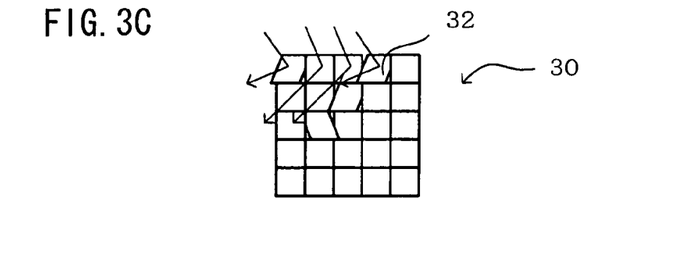

Further, as shown in FIG. 3B, the headlamp 12 may use a structure in which light from a single light source 28 is reflected by a DMD (digital micromirror device) 30 so as to be illuminated forward of the vehicle via a lens 31. As shown in FIG. 3C, the DMD 30 is a device that includes plural micromirrors 32 in a manner such that rotation of each of the micromirrors 32 is controllable. That is, a light source driver 34, which turns on the light source 28, and a DMD driver 36, which drives to rotate each micromirror 32 of the DMD 30, are provided to serve as the headlamp driver 20. The light source 28 is turned on by the light source driver 34, toration of each micromirror 32 of the DMD 30 is controlled by the DMD driver 36, and thus illumination or non-illumination of light with respect to each of the divided regions shown in FIG. 2 can be controlled.

In the present embodiment, description is given of a structure including the plural LED light sources 24. Note that the structure of the headlamp 12 is not limited to the above. For example: a plurality of shutters or the like which block light to be illuminated forward of the vehicle from a single light source may be provided, wherein the respective shutters may be sized so as to correspond to the divided regions, thereby enabling the respective divided regions shown in FIG. 2 to be lighted on and off. Alternatively, instead of the DMD 30, a spatial light modulator or the like such as liquid crystal device other than the DMD 30 may be used.

Figure 4A:
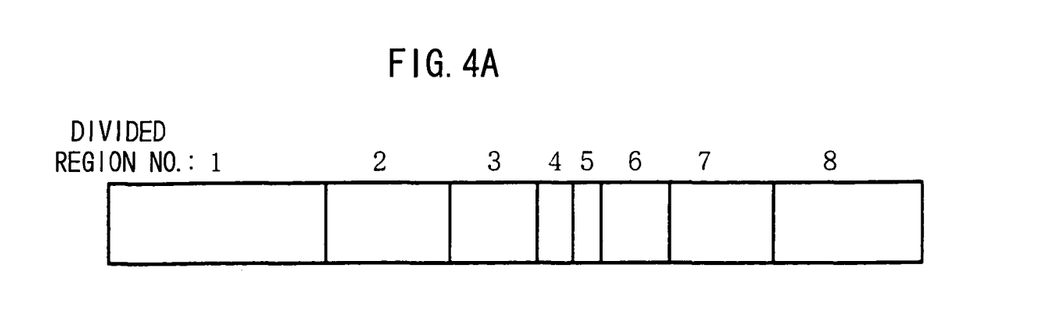
FIG. 4A is a diagram for describing divided regions of a headlamp of the vehicular illumination device relating to an embodiment of the present invention.

FIG. 4A is a diagram for describing the divided regions of the headlamp 12 of the vehicular illumination device 10 relating to the embodiment of the present invention.

As shown in FIG. 4A, a division pattern of the divided regions of the headlamp 12 in the present embodiment is set up such that division width of a divided region at a substantially central portion in the vehicle width direction is shorter in the vehicle width direction than that of divided regions at vehicle width direction end portions, and such that the divided regions are progressively longer in the vehicle width direction toward vehicle width direction outer sides. However, note that the division pattern is not limited to the above.

At the headlamp 12, the LED light sources 24 that correspond to the respective divided regions are set in advance, and illumination or non-illumination of each divided region is implemented by selectively lighting the plural LED light sources 24.

Figure 4B:
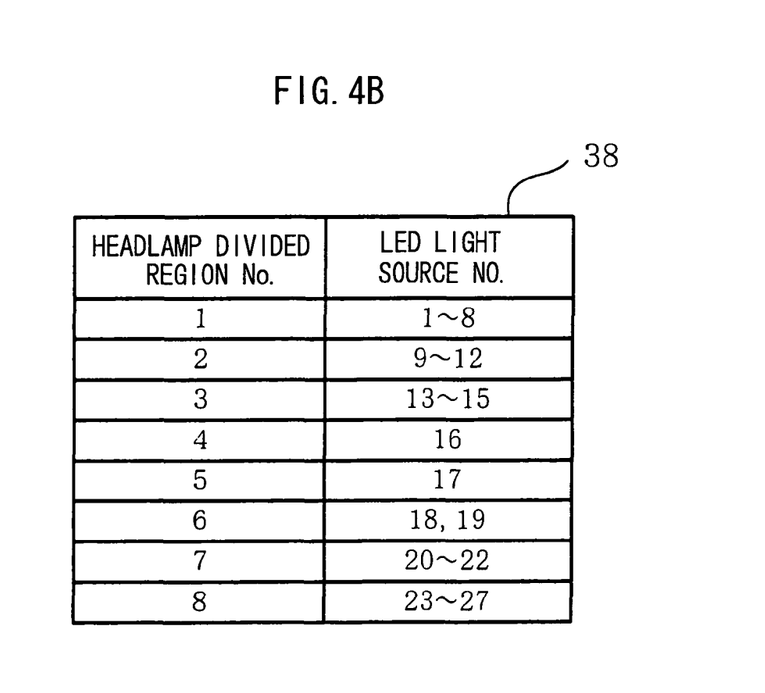
FIG. 4B is a diagram showing a table of light source-divided region correspondences.

For example, as shown in FIG. 4B, the present embodiment is arranged such that: LED light sources Nos. 1 to 8 correspond to the LED light sources 24 associated with the divided region No. 1; LED light sources Nos. 9 to 12 correspond to the LED light sources 24 associated with the divided region No. 2; LED light sources Nos. 13 to 15 correspond to the LED light sources 24 associated with divided region No. 3; LED light source No. 16 correspond to the LED light sources 24 associated with the divided region No. 4; LED light source No. 17 corresponds to the LED light sources 24 associated with the divided region No. 5; LED light sources Nos. 18 and 19 correspond to the LED light sources 24 associated with the divided region No. 6; LED light sources Nos. 20 to 22 correspond to the LED light sources 24 associated with the divided region No. 7; and LED light sources Nos. 23 to 27 correspond to the LED light sources 24 associated with the divided region No. 8. Hence, by controlling the lighting and extinguishing of the LED light sources 24 associated with the respective divided regions, illumination or non-illumination of light at each divided region is enabled. Thus, by storing the correspondences shown in FIG. 4B in the ROM 14C or the like in the form of a light source-divided region correspondences table 38 so that the light distribution control ECU 14 controls lighting using this light source-divided region correspondences table 38, the lighting and extinguishing of the headlamp 12 for each region is enabled.

In the present embodiment, the divided regions are determined based on the number of lighted LED light sources 24, but this constitutes no limitation. For example, the size of the divided region may be determined based on the size or characteristic of lens or light source.

As described above, the vehicular illumination device 10 relating to the embodiment of the present invention detects an opposing vehicle based on a captured image from the camera 18 and specifies a region corresponding to the opposing vehicle, and the light distribution control ECU 14 controls a light distribution of the headlamps 12 such that light from the headlamps 12 is not illuminated onto the region corresponding to the opposing vehicle. However, if a momentary vertical vehicle movement occurs when the subject vehicle drives over a step or the like, the opposing vehicle will temporarily fall outside a range of detection by the camera 18, but the opposing vehicle will promptly be detected again. In such a case, the divided region corresponding to the opposing vehicle will be brought to a non-illuminated state as soon as light shifts from a non-illuminating state to an illuminating state. Consequently, control chattering will occur, which will appear to be flashing to a driver of the opposing vehicle.

In the vehicular illumination device 10 relating to the embodiment of the present invention, a vertical movement of the height of the subject vehicle is detected by a vehicle height sensor 40, and if the magnitude of the vertical movement is equal to or greater than a predetermined value that exceeds the detection range of the camera 18 or a predetermined range, control is performed such that the light distribution control is maintained, that is, the non-lighting of divided region(s) corresponding to opposing vehicle(s) is maintained. Consequently, chattering of the light distribution control that occurs when the vehicle drives over a road surface step or the like can be prevented.

Next, the light distribution control that is performed by the light distribution control ECU 14 of the vehicular illumination device relating to the embodiment of the present invention will be described in detail.

Figure 5:
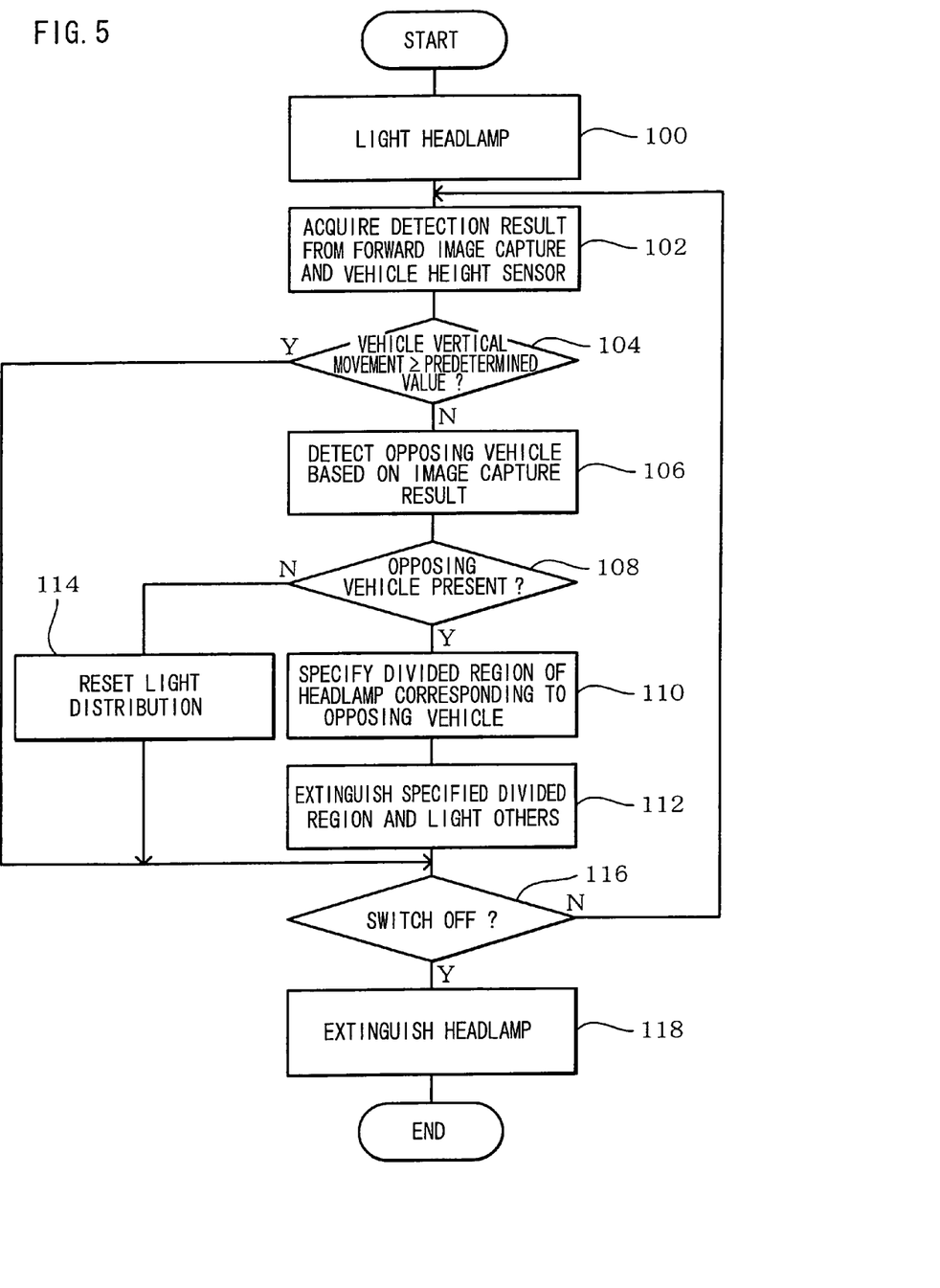
FIG. 5 is a flowchart showing an example of a light distribution control routine which is performed by a light distribution control ECU of the vehicular illumination device relating to an embodiment of the present invention.

FIG. 5 is a flowchart showing an example of a light distribution control routine that is carried out by the light distribution control ECU 14 of the vehicular illumination device 10 relating to the embodiment of the present invention. The light distribution control routine shown in FIG. 5 is started when lighting of the headlamp 12 is instructed by the switch 16 being actuated by an occupant. Further, in a case where the switch 16 is equipped with an automatic lighting mode, automatic lighting may be instructed by an occupant and the routine may be started when a predetermined condition for lighting the headlamp 12 is satisfied.

When lighting of the headlamp 12 is instructed by the switch 16 being actuated by an occupant, in step 100, the headlamp 12 is lighted. That is, the CPU 14A controls the headlamp driver 20 via the I/O 14D such that the headlamps 12 are lighted as a result of the respective LED light sources 24 of the two headlamps 12 being driven.

In step 102, an imaging result of image capture forward of the vehicle by the camera 18 is acquired at the light distribution control ECU 14 via the I/O 14D, and a vehicle height detection result detected by the vehicle height sensor 40 is acquired at the light distribution control ECU 14 via the I/O 14D. Then, the routine proceeds to step 104.

In step 104, it is judged from the detection result from the vehicle height sensor 40 whether or not magnitude of a vehicle vertical movement is equal to or greater than a predetermined value. That is, it is judged whether or not a momentary vehicle vertical movement equal to or greater than the predetermined value has occurred as a result of the vehicle driving over a road surface step. If the judgment is negative, the routine proceeds to step 106, whereas if the judgment is positive, the routine proceeds to step 116 while a current state of light distribution control (for example, a state in which an opposing vehicle has been detected and a corresponding divided region is extinguished) is maintained. When it is judged, based on a detection result from the vehicle height sensor 40, whether or not a vehicle vertical movement is equal to or greater than a predetermined value, it is possible that a longitudinal direction inclination of the vehicle may be calculated from a front-rear difference based on detection results from the vehicle height sensor 40, and it may be judged whether or not the longitudinal direction inclination is equal to or greater than a predetermined angle. Furthermore, although in the present embodiment the judgment is positive when the vertical movement is equal to or greater than the predetermined value that exceeds the detection range of the camera 18 or a predetermined range, it is also possible that the judgment in step 104 is positive when vertical movement is detected by the vehicle height sensor 40.

In step 106, an opposing vehicle is detected by the CPU 14A based on an result of image capture by the camera 18, and the routine proceeds to step 108. Note that detection of an opposing vehicle can be achieved using various known technologies. For example, an opposing vehicle can be detected by performing a process in which a light bright point is detected using image processing.

In step 108, it is judged by the CPU 14A whether or not an opposing vehicle is present ahead. If the judgment is positive, the routine proceeds to step 110, whereas if the judgment is negative, the routine proceeds to step 114.

In step 110, a divided region(s) of the headlamp 12 corresponding to a region in which the opposing vehicle is present is/are identified by the CPU 14A, and the routine proceeds to step 112.

In step 112, the identified divided region(s) is/are extinguished and the other divided regions are lighted, and the routine advances to step 116. That is, a divided region corresponding to the opposing vehicle is extinguished as a result of the headlamp driver 20 being controlled by the light distribution control ECU 14, and thus glare light to an opposing vehicle can be suppressed even when running with high-beams lights.

In step 114, the light distribution is reset. That is, since there may be a case in which the divided regions are extinguished due to the light distribution control having been performed, the light distribution control is reset so that all the divided regions are lighted, and the routine proceeds to step 116.

In step 116, it is judged by the CPU 14A whether or not the switch 16 has been switched off. When the judgment is negative, the routine returns to step 102 and the above-described processing is repeated. When the judgment in step 116 is positive, the routine advances to step 118, the headlamps 12 are extinguished, and the sequence of processing ends.

Figure 6A:
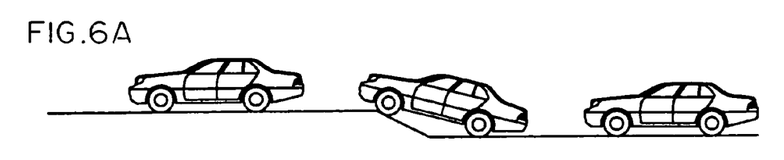
FIG. 6A and FIG. 6B are diagrams for explaining light distribution control chattering, which occurs when the vehicle drives over a road surface step.
Figure 6B:
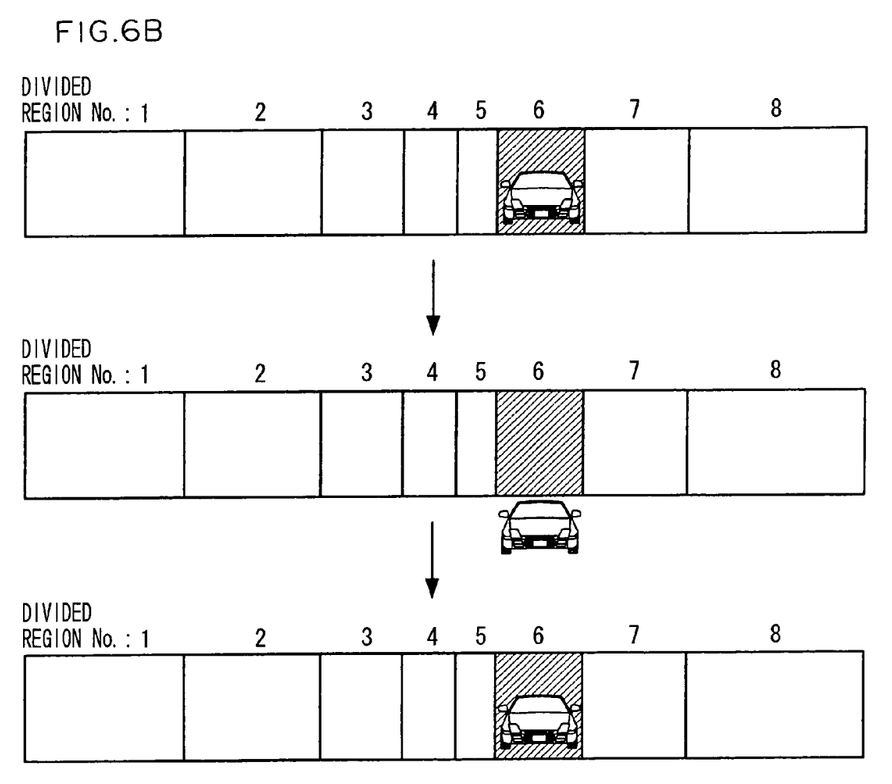

For example, when light distribution control is being performed to extinguish a divided region of the headlamp 12 which corresponds to an opposing vehicle, if the subject vehicle drives over a road surface step as shown in FIG. 6A, the opposing vehicle falls outside the detection range of the camera 18 as the subject vehicle drives over the road surface step, as shown in FIG. 6B, and after the subject vehicle has driven over the road surface step, the opposing vehicle again enters the detection range of the camera 18. In this case, control is performed such that a divided region of the headlamp 12 corresponding to the opposing vehicle, which is extinguished when the subject vehicle drives over the road surface step, is lighted and then promptly extinguished. However, in the present embodiment, before detection of an opposing vehicle is implemented in step 108, it is judged in step 104 whether or not a vertical movement of the vehicle is equal to or greater than a predetermined value. Thus, when the opposing vehicle detected by the camera 18 becomes no longer detected, it is judged whether or not it is necessary to maintain the alteration of the light distribution control in the current state. Consequently, when driving over a road surface step, the subject vehicle undergoes a vertical movement equal to or greater than the predetermined value, and thus the judgment in step 104 is positive, and processing in steps 106-114 to perform light distribution control by newly implementing detection of an opposing vehicle is not performed; thus, the routine proceeds to step 116, so that the current state of the light distribution control is maintained. That is, since a current state of light distribution control is maintained when driving over a road surface step, even if an opposing vehicle momentarily falls outside the detection range of the camera 18 or a predetermined range as when driving a road surface step, the extinguishing of a divided region for which the opposing vehicle has previously been detected and which has been extinguished is maintained, and chattering of the light distribution control can be prevented. Further, since control chattering can be prevented, it is possible to suppress a load increase in the light distribution control.

Thus, when a vertical movement of the vehicle exceeds the predetermined value, since the light distribution control is maintained, chattering of the light distribution control can be prevented while securing the alteration control of the light distribution in a required range.

In the embodiment described above, description has been given of the case in which an opposing vehicle is detected as an illumination object and the light distribution is controlled such that a region corresponding to the opposing vehicle is brought to a non-illumination state or reduced light or a state in which light is reduced. However, this constitutes no limitation, and it is possible that a pedestrian may be a illumination object, or that both an opposing vehicle(s) and a pedestrian(s) may be an illumination object(s). Further, as light distribution control, light distribution control in which a light axis is shifted or some other type of light distribution control may be implemented.

Further, although, in the embodiment described above, high beam and low beam are not referred to specifically, it is possible that the above-described light distribution control may be performed only with respect to a region of high beam, with respect to regions of high beam and low beam, or only with respect to a region of low beam. For example, when the above-described light distribution control is performed with respect to regions of high beam and low beam or only respect to a region of high beam, glare light to an opposing vehicle(s) can be suppressed even with high beam lights so that the subject vehicle can travel with high-beam lighting.

Further, although, in the embodiment described above, an illumination object such as an opposing vehicle is detected using the camera 18 as a detection unit, this constitutes no limitation. For example, a detection unit comprising a radar or the like may be used.

Further, although, in the embodiment described above, the headlamp 12 is used as the vehicular illumination unit of the present invention, this constitutes no limitation, and an auxiliary headlamp or other type of vehicular illumination unit may be used.

While the present invention has been illustrated and described with respect to specific embodiments thereof, it is to be understood that the present invention is by no means limited thereto and encompasses all changes and modifications which will become possible within the scope of the appended claims.

What is claimed is:

1. A vehicular illumination device comprising:

a vehicular illumination unit whose light distribution is alterable;

a detection unit that detects an illumination object comprising at least one of other vehicles and pedestrians;

a light distribution control unit that performs an alteration control of the vehicular illumination unit such that light illuminated from the vehicular illumination unit to a region corresponding to the illumination object detected by the detection unit is non-illuminated or reduced;

a determination unit that, when the illumination object detected by the detection unit ceases to be detected, determines whether or not there is a need to maintain the alteration control by the light distribution control unit in a current state, and determines that there is a need to maintain the alteration control by the light distribution control unit in the current state when a vertical movement is detected by a vertical movement detection unit, which detects a vertical movement of the vehicle; and a control unit that, when it is determined by the determination unit that there is a need to maintain the alteration control in the current state, controls the light distribution control unit so as to maintain the alteration control by the light distribution control unit in the current state.

2. The vehicular illumination device of claim 1, wherein the determination unit determines that there is a need to maintain the alteration control by the light distribution control unit in the current state when the vertical movement which is equal to or greater than a predetermined value is detected by the vertical movement detection unit.

3. The vehicular illumination device of claim 2, wherein the vertical movement detection unit comprises a vehicle height detection sensor that detects a vehicle height of the vehicle.

4. The vehicular illumination device of claim 1, wherein the vertical movement detection unit comprises a vehicle height detection sensor that detects a vehicle height of the vehicle.

* * * * *